(12) United States Patent
Kobayashi et al.

(10) Patent No.: US 11,655,879 B2
(45) Date of Patent: May 23, 2023

(54) DRIVE DEVICE AND MOVABLE BODY

(71) Applicant: NIDEC CORPORATION, Kyoto (JP)

(72) Inventors: Hiroshi Kobayashi, Kyoto (JP); Takeshi Ohiro, Kyoto (JP); Takuya Ogawa, Kyoto (JP); Ryosuke Takahashi, Kyoto (JP); Toshitsugu Yamamoto, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/694,671

(22) Filed: Mar. 15, 2022

(65) Prior Publication Data
US 2022/0299087 A1 Sep. 22, 2022

(30) Foreign Application Priority Data

Mar. 18, 2021 (JP) .............................. JP2021-045229

(51) Int. Cl.
*F16H 57/08* (2006.01)
*F16H 1/32* (2006.01)
*F16H 57/021* (2012.01)
*A61G 5/04* (2013.01)

(52) U.S. Cl.
CPC ............... *F16H 1/32* (2013.01); *A61G 5/045* (2013.01); *F16H 57/021* (2013.01); *F16H 57/082* (2013.01); *F16H 2001/327* (2013.01)

(58) Field of Classification Search
CPC .... F16H 1/32; F16H 57/021; F16H 2001/327; F16H 3/72; A61G 5/045; B60K 17/043; B60K 17/046
See application file for complete search history.

(56) References Cited

U.S. PATENT DOCUMENTS

| 5,322,141 | A | * | 6/1994 | Brunner | B60K 7/0007 |
| | | | | | 180/65.6 |
| 5,382,854 | A | * | 1/1995 | Kawamoto | H02K 9/19 |
| | | | | | 310/67 R |
| 5,472,059 | A | * | 12/1995 | Schlosser | B60K 7/0007 |
| | | | | | 475/159 |
| 5,677,582 | A | * | 10/1997 | Lutz | B60K 17/12 |
| | | | | | 310/113 |

(Continued)

FOREIGN PATENT DOCUMENTS

| CN | 101247968 A | * | 8/2008 | ........... B60K 17/043 |
| CN | 102756641 A | * | 10/2012 | ........... B60K 17/046 |

(Continued)

*Primary Examiner* — Sherry L Estremsky
(74) *Attorney, Agent, or Firm* — Hauptman Ham, LLP

(57) ABSTRACT

A motor unit having a motor shaft, and a speed reduction mechanism connected to the motor shaft are included. The speed reduction mechanism includes a sun gear unit disposed on the motor shaft, planetary gear units meshing with the sun gear unit and arranged in the circumferential direction, a carrier at least a part of which surrounds the planetary gear units, and an output unit connected to the planetary gear units. The carrier includes a first cylindrical portion disposed outward of and above the sun gear unit and extending in the axial direction. The first cylindrical portion rotatably supports the output unit via a bearing, and the bearing is at least partly disposed radially inward of the radially outer end of the planetary gear unit.

13 Claims, 9 Drawing Sheets

(56) References Cited

U.S. PATENT DOCUMENTS

| | | | | |
|---|---|---|---|---|
| 6,398,685 | B1 * | 6/2002 | Wachauer | ............ H02K 16/005 |
| | | | | 180/65.6 |
| 10,167,929 | B2 * | 1/2019 | Okumura | .................. F16H 1/28 |
| 11,041,547 | B2 | 6/2021 | Yoo et al. | |

FOREIGN PATENT DOCUMENTS

| | | | |
|---|---|---|---|
| DE | 3924817 A1 * | 1/1991 | |
| FR | 2264676 A1 * | 3/1974 | |
| FR | 2727655 A1 * | 6/1996 | ........... B60K 17/046 |

\* cited by examiner

DRIVE DEVICE AND MOVABLE BODY

CROSS-REFERENCE TO RELATED APPLICATIONS

The present invention claims priority under 35 U.S.C. § 119 to Japanese Patent Application No. 2021-045229 filed on Mar. 18, 2021, the entire content of which is incorporated herein by reference.

FIELD OF THE INVENTION

The present disclosure relates to a drive device and a movable body including the drive device.

BACKGROUND

Conventionally, a drive device using an electric motor has been known. This type of drive device is used for, for example, a movable body such as an electric wheelchair. The drive device includes a motor, and outputs rotation of the motor to the outside using a planetary gear mechanism.

In the drive device described above, a bearing that rotatably supports the output unit connected to the planetary gear is disposed radially outward of the planetary gear, which makes it difficult to reduce the radial width.

SUMMARY

An exemplary drive device of the present disclosure includes a motor unit having a motor shaft disposed along a central axis extending vertically, and a speed reduction mechanism connected to an upper portion of the motor shaft. The speed reduction mechanism includes a sun gear unit disposed on a radially outer surface of the motor shaft, a plurality of planetary gear units meshing with the sun gear unit and arranged in the circumferential direction, a carrier at least a part of which surrounds radially outer sides of the planetary gear units, and an output unit connected to the planetary gear units. The carrier includes a first cylindrical portion disposed radially outward of and above the sun gear unit and extending in the central axis direction. The first cylindrical portion rotatably supports the output unit via a bearing, and the bearing is at least partly disposed radially inward of the radially outer ends of the planetary gear units.

An exemplary movable body of the present invention includes a drive device, a power supply unit that supplies electric power to the drive device, and a wheel connected to the drive device.

The above and other elements, features, steps, characteristics and advantages of the present disclosure will become more apparent from the following detailed description of the preferred embodiments with reference to the attached drawings.

DETAILED DESCRIPTION

Hereinafter, exemplary embodiments of the present disclosure will be described in detail with reference to the drawings. In the present specification, a drive device 10 will be described with reference to the state of the drive device 10 illustrated in FIG. 2. In the drive device 10, a central axis J1 extends in the vertical direction. The direction in which the central axis J1 extends is referred to as an "axial direction". A direction orthogonal to the central axis J1 is referred to as a "radial direction", and a direction along the arc centered on the central axis J1 is referred to as a "circumferential direction".

Note that the above-described direction is defined for ease of description, and may not coincide with the direction of the drive device 10 actually used. For example, when the drive device 10 is attached to a movable body 100, the central axis J1 of the drive device 10 extends in a direction parallel to the horizontal direction. Hereinafter, in the case of describing the movable body 100, the front side in the traveling direction is referred to as front F, and the rear side in the traveling direction is referred to as rear R.

Figure 1:
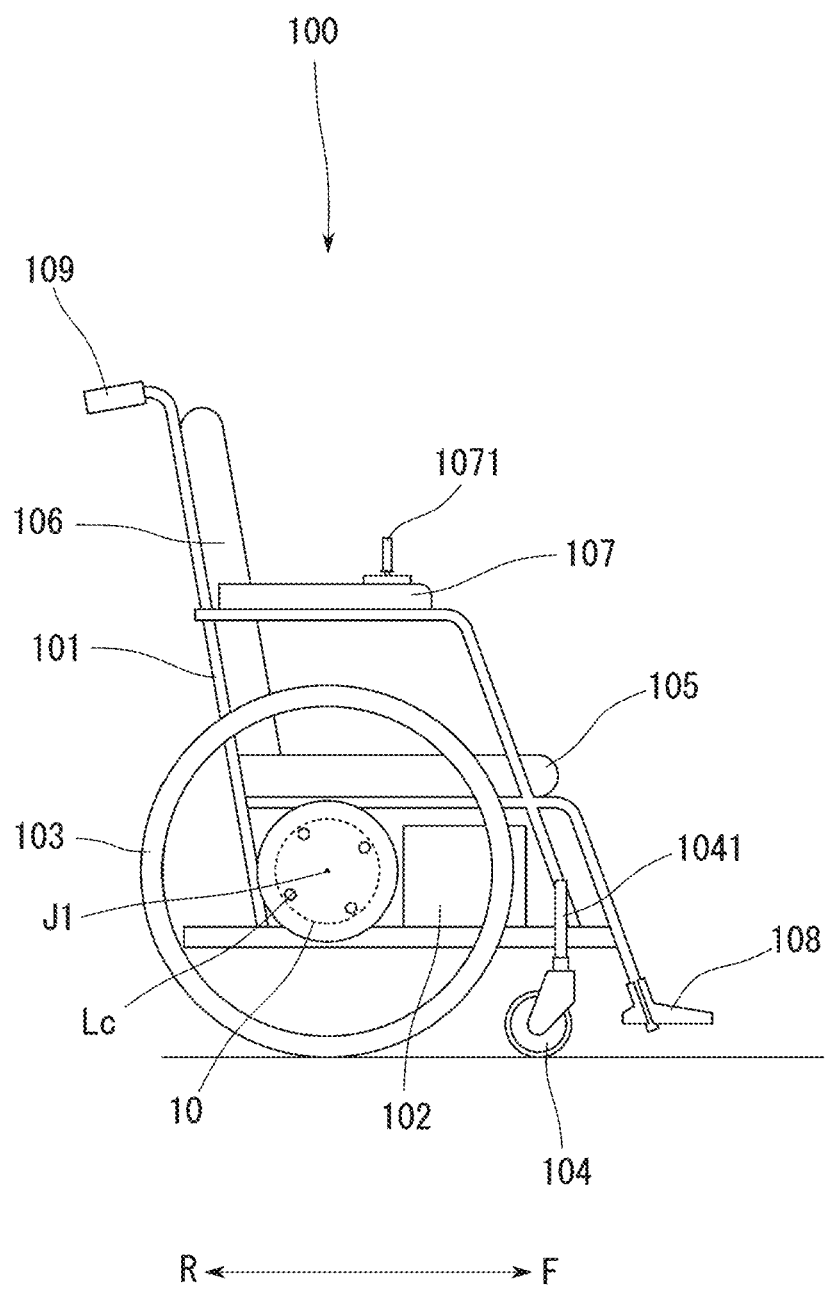
FIG. 1 is a schematic diagram of an electric wheelchair that is an example of a movable body according to an embodiment of the present invention.

FIG. 1 is a schematic diagram of the movable body 100 according to an embodiment of the present invention. In the present embodiment, the movable body 100 is an electric wheelchair that transports a user in a seated state. The movable body 100 includes the drive device 10, a power supply 102, and wheels. Therefore, since the drive device 10 has a configuration described below, the size can be reduced without reducing the output torque, and thus, the size can be reduced without reducing the output torque in the drive device 10 mounted on the movable body 100. In the present embodiment, as illustrated in FIG. 1, the movable body 100 includes a frame 101, the power supply 102, the drive device 10, a driving wheel 103, and a driven wheel 104.

The frame 101 is formed in a chair shape by combining rod-shaped metals. The frame 101 includes a seat 105, a backrest 106, an armrest 107, and a footrest 108. The seat 105 is disposed substantially horizontally, and an upper surface of the seat 105 is a seat surface of the movable body 100.

The backrest 106 is disposed on the rear R of the seat 105. The backrest 106 extends upward from an end portion at the rear R of the seat 105. The backrest 106 supports the upper body, that is, the back of the seated user. The upper end of the backrest 106 may have a push handle 109 protruding toward the rear R. The push handle 109 is used when a person other than the user (for example, a caregiver) performs pushing by hand. Note that the push handle 109 may be omitted as long as no hand pushing is performed.

The armrests 107 are disposed above both left and right sides of the seat 105. The armrest 107 can allow a portion from the elbow to the tip of a hand of the seated user to be placed. At the portions of the seat 105, the backrest 106, and the armrest 107 that come into contact with the user, cushion members are disposed. As a result, even if the user sits on the movable body 100 for a long time, the user is less likely to feel pain. Further, above the armrest 107, an operation unit 1071 operable by a user is disposed. The movable body 100 moves when the operation unit 1071 is operated.

The footrest 108 is disposed at a distal end of a frame extending downward from the front F end of the seat 105. A user's foot can be placed on top of the footrest 108. By disposing the foot on top of the footrest 108, it is possible to suppress the user's foot from coming into contact with the ground when the movable body 100 moves.

The power supply 102 is connected to the drive device 10 and supplies electric power to the drive device 10. Here, the power supply 102 is a battery. The power supply 102 is disposed on the frame 101 below the seat 105. The driving wheels 103 are disposed on both left and right sides of the frame 101. The driving wheels 103 are fixed to an output unit 35 described later. In the present embodiment, the driving wheel 103 is an example of a wheel. The driving wheel 103 is fixed to the output unit 35 (see FIG. 2) to be described later of the drive device 10. The center of rotation of the driving wheel 103 coincides with the central axis J1 of the drive device 10. The driving wheel 103 is rotated by the drive device 10.

The driven wheel 104 is disposed in front F of the driving wheel 103. The driven wheel 104 is attached to the mounting frame 1041 extending in the vertical direction, and is rotatable about a driven shaft orthogonal to the mounting frame 1041. The driven wheel 104 is rotatable about the center line of the mounting frame 1041.

The drive device 10 is attached to the frame 101. The drive device 10 rotates the driving wheel 103 attached to the output unit 35. Details of the drive device 10 will be described below.

In the movable body 100, electric power is supplied from the power supply 102 to the drive device 10 when the user who is seated on the seat 105, whose upper body is leaned on the backrest 106 and whose foot is placed on the footrest 108, operates the operation unit 1071. As a result, the output unit 35 rotates, the driving wheel 103 rotates by the output unit 35, and the movable body 100 moves. In the movable body 100, when the rotation directions and the rotation speeds of the left and right driving wheels 103 are the same, the movable body 100 moves straight to the front F or the rear R. In addition, when the rotation directions of the left and right driving wheels 103 are opposite to each other or there is a difference in the rotation speed, the movable body 100 turns in the left-right direction.

Figure 2:
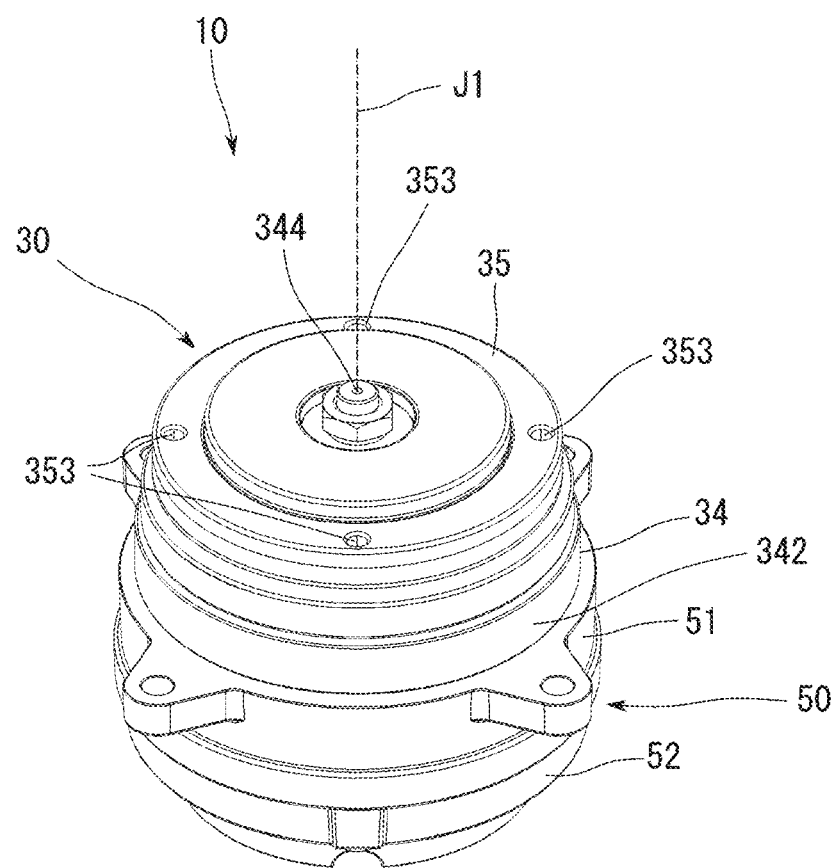
FIG. 2 is a perspective view of a drive device.
Figure 3:
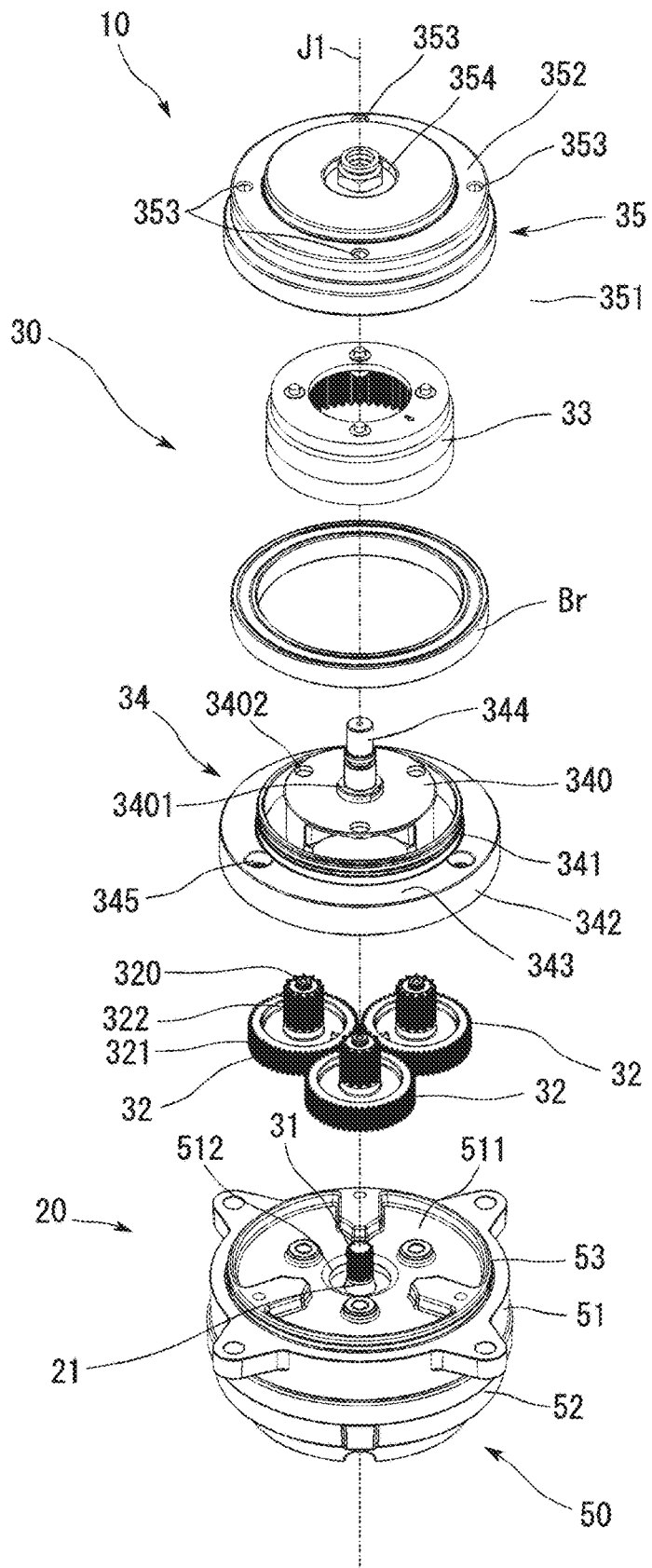
FIG. 3 is an exploded perspective view of the drive device.
Figure 4:
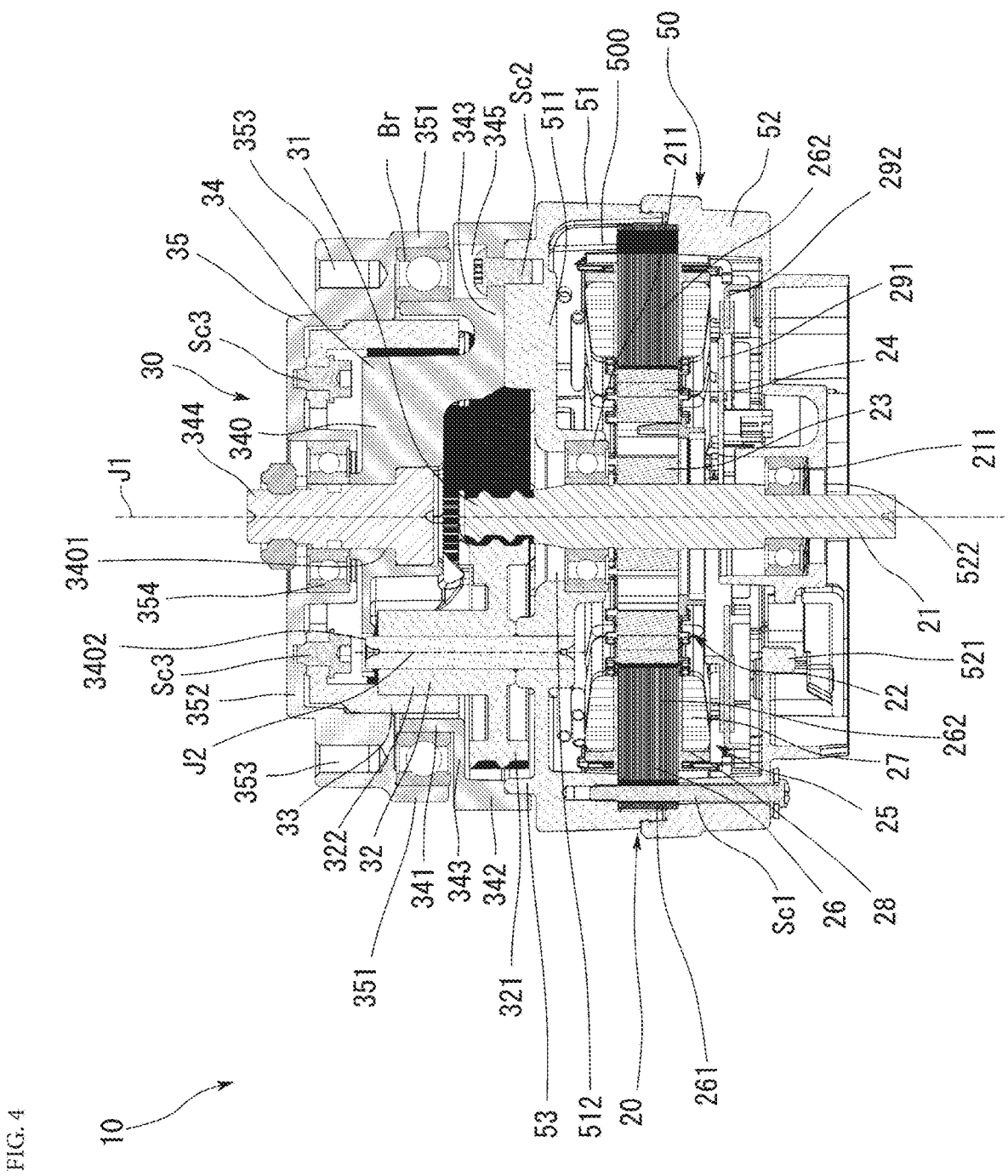
FIG. 4 is a cross-sectional view of the drive device.

Next, details of the drive device 10 will be described with reference to the drawings. FIG. 2 is a perspective view of the drive device 10. FIG. 3 is an exploded perspective view of the drive device 10. FIG. 4 is a cross-section view of the drive device 10.

As illustrated in FIGS. 2 to 4, the drive device 10 includes a motor unit 20 and a speed reduction mechanism 30.

The motor unit 20 is a DC brushless motor. The motor unit 20 is driven by electric power from the power supply 102. The motor unit 20 includes a motor shaft 21, a rotor 22, and a stator 25. A part of the motor shaft 21, the rotor 22, and the stator 25 are disposed inside the housing 50. The motor unit 20 is an inner rotor type motor in which the rotor 22 is arranged radially inward the stator 25. Note that the motor unit 20 may be an inner rotor type motor or an outer rotor type motor.

The motor shaft 21 has a substantially cylindrical shape. As illustrated in FIGS. 2 to 4, the motor shaft 21 extends along the central axis J1 extending vertically. This means that the motor unit 20 includes the motor shaft 21 disposed along the vertically extending central axis J1. The motor shaft 21 is rotatable about the central axis J1. As illustrated in FIG. 4, the upper end of the motor shaft 21 protrudes above the housing 50.

The motor shaft 21 is rotatably supported by the housing 50 via the shaft bearing 211. The shaft bearings 211 are arranged at two places separated in the axial direction, and rotatably support two places separated in the axial direction of the motor shaft 21. In this example, the shaft bearing 211 is a ball bearing, but is not limited thereto. A bearing structure capable of smoothly and accurately supporting the motor shaft 21 can be widely adopted.

The rotor 22 is fixed to an outer circumference of the motor shaft 21. The rotor 22 includes a rotor core 23 and a rotor magnet 24. The rotor 22 rotates about the central axis J1 extending in the horizontal direction.

The rotor core 23 is formed by laminating thin electromagnetic steel plates. The rotor core 23 is a columnar body extending along the axial direction. Note that the rotor core 23 may be formed by sintering magnetic powder. A plurality of rotor magnets 24 are fixed to the rotor core 23. The plurality of rotor magnets 24 are aligned along the circumferential direction with the magnetic poles arranged alternately.

The stator 25 has a stator core 26, a coil 27, and an insulator 28. The stator 25 is held by the housing 50. The stator core 26 includes a core back 261 and a plurality of teeth 262. The core back 261 has an annular shape. The radially outer surface of the core back 261 is fixed to the housing 50. The teeth 262 protrude from a radially inner surface of the core back 261 in a direction approaching the central axis J1. The plurality of teeth 262 are arranged at regular intervals in the circumferential direction. That is, the coil 27 is formed by winding a conducting wire around the teeth 262.

As illustrated in FIGS. 2 and 3, the housing 50 has a cylindrical shape. The housing 50 has a housing upper portion 51 and a housing lower portion 52. The housing upper portion 51 has a covered cylindrical shape having a lid 511 at an axially upper portion, and has an opening at a lower portion. The housing lower portion 52 has a bottomed cylindrical shape having a bottom portion 521 at a lower portion, and has an opening at an upper portion.

The housing upper portion 51 is arranged above the housing lower portion 52. At this time, the opening of the housing upper portion 51 and the opening in the upper portion of the housing lower portion 52 face each other in the axial direction. Then, the housing upper portion 51 and the housing lower portion 52 are fixed to each other with a fastening part such as a screw Sc1. The fastening part is not limited to the screw Sc1, and a configuration that can firmly fix the housing upper portion 51 and the housing lower portion 52 can be widely adopted. In the housing 50, the screw Sc1 is also used for fixing the stator 25.

The housing 50 has an internal space 500 surrounded by the housing upper portion 51 and the housing lower portion 52. An intermediate portion in the axial direction of the motor shaft 21, the rotor 22, and the stator 25 are accommodated in the internal space 500.

More specifically, the motor shaft 21 penetrates a through hole 512 formed in the lid 511 of the housing upper portion 51 and penetrating in the axial direction. The motor shaft 21 also penetrates a through hole 522 formed in the bottom portion 521 of the housing lower portion 52 and penetrating in the axial direction. The motor shaft 21 is rotatably supported via the shaft bearing 211 attached to the through hole 512 and the through hole 522.

A bracket 53 is disposed on the upper surface of the lid 511 of the housing upper portion 51. The bracket 53 has an annular shape extending upward along the central axis J1 from the upper surface of the lid 511. That is, the housing 50 surrounds the radially outer side of a part of the motor shaft 21. In the present embodiment, the bracket 53 surrounds the radially outer side of a part of the motor shaft 21. Note that the bracket 53 may be discontinuously formed with a notch or the like provided in a part in the circumferential direction.

Below the motor unit 20, accessories such as a substrate 291 and a bus bar 292 are attached. On the substrate 291, a control circuit for controlling the electric current supplied to the coil 27 is mounted. The bus bar 292 is a conductive member that connects the control circuit mounted on the substrate 291 and the coil 27.

The motor unit 20 is driven by electric power supplied from the power supply 102. That is, when the current supplied from the power supply 102 is supplied to the coil 27, the coil 27 is excited. When the coil 27 is excited, a magnetic force is generated between the rotor magnet 24 of the rotor 22 and the coil. By exciting the plurality of coils 27 at an appropriate timing, torque in the circumferential direction around the central axis J1 is generated in the rotor 22. With the torque, the motor shaft 21 rotates about the central axis J1.

Figure 5:
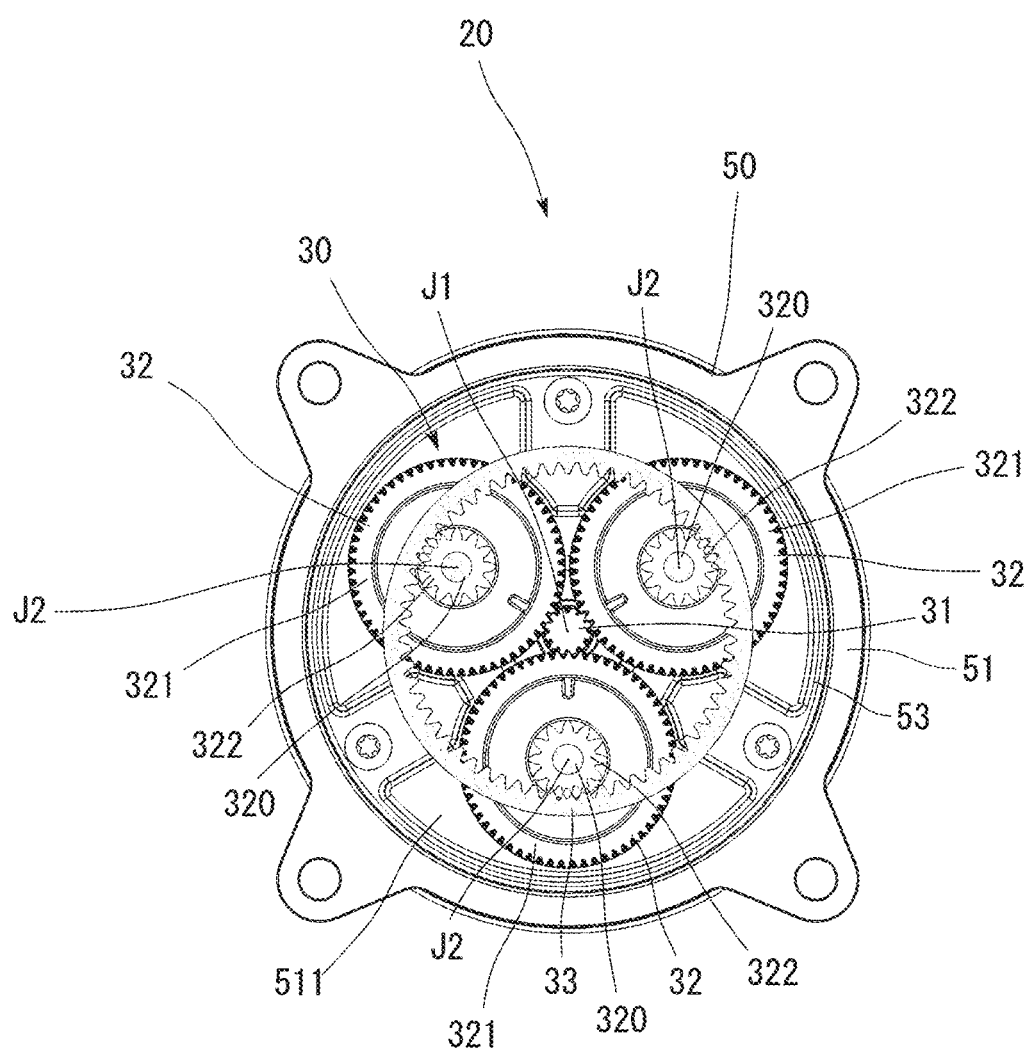
FIG. 5 is a cross-sectional view taken along a plane orthogonal to a central axis of a speed reduction mechanism.

FIG. 5 is a cross-sectional view of the speed reduction mechanism 30 taken along a plane orthogonal to the central axis J1. As illustrated in FIG. 4, the speed reduction mechanism 30 includes a sun gear unit 31, a planetary gear unit 32, a carrier 34, and the output unit 35. More specifically, the speed reduction mechanism 30 further includes an internal gear part 33. The speed reduction mechanism 30 decelerates the rotation of the motor shaft 21 using a so-called planetary gear mechanism.

As illustrated in FIGS. 3 to 5, the sun gear unit 31 is disposed at the upper end of the motor shaft 21. The sun gear unit 31 is disposed on the radially outer surface of the motor shaft 21. The sun gear unit 31 rotates integrally with the motor shaft 21. Therefore, the sun gear unit 31 may be formed of a single member with the motor shaft 21, or may be attached to the motor shaft 21 and fixed by a fixing method such as adhesion, welding, screwing, caulking, or press fitting. A fixing method other than these may be adopted. Besides, a fixing method that can fix the sun gear unit 31 to the motor shaft 21 in an integrally rotatable manner can be widely adopted.

As illustrated in FIGS. 3 to 5, the speed reduction mechanism 30 includes three planetary gear units 32. The three planetary gear units 32 are arranged in the circumferential direction. The three planetary gear units 32 are arranged side by side at equal intervals in the circumferential direction. The planetary gear units 32 engage with the sun gear unit 31. Although the speed reduction mechanism 30 of the present embodiment includes the three planetary gear units 32, the number of planetary gear units is not limited to three. Two or more planetary gear units 32 may be provided. Further, the arrangement of the planetary gear units 32 in the circumferential direction is not limited to equal intervals. That is, the plurality of planetary gear units 32 mesh with the sun gear unit 31 and are arranged in the circumferential direction.

The planetary gear unit 32 will be further described. The planetary gear unit 32 includes a first planetary gear 321 and a second planetary gear 322. More specifically, the planetary gear unit 32 includes a planetary shaft 320, the first planetary gear 321, and the second planetary gear 322. The planetary shaft 320 extends along a planetary axis J2 parallel to the central axis J1. As illustrated in FIG. 4, the lower end portion of the planetary shaft 320 is fixed to the lid 511 of the housing upper portion 51. The upper end portion of the planetary shaft 320 is inserted into a planetary through hole 3402 provided to the carrier 34.

The first planetary gear 321 and the second planetary gear 322 are rotatably supported by the planetary shaft 320. The first planetary gear 321 and the second planetary gear 322 are coupled in the axial direction. That is, the first planetary gear 321 and the second planetary gear 322 are integrally rotatable about the planetary axis J2 parallel to the central axis J1.

As illustrated in FIGS. 4 and 5, the first planetary gear 321 meshes with the sun gear unit 31. The second planetary gear 322 has a smaller diameter than that of the first planetary gear 321. That is, the second planetary gear 322 has a smaller diameter than that of the first planetary gear 321 and is connected to the first planetary gear 321. That is, the number of teeth of the second planetary gear 322 is smaller than the number of teeth of the first planetary gear 321.

The second planetary gear 322 rotates integrally with the first planetary gear 321. That is, the planetary gear unit 32 is a two-stage gear. However, the planetary gear unit 32 is not limited to the two-stage gear. The planetary gear unit 32 may be a multistage gear having three or more stages, or may have a single diameter, that is, a configuration including only a gear having a predetermined number of teeth. The first planetary gear 321 and the second planetary gear 322 may be formed of a single member, or may be fixed by using a fixing method such as adhesion, welding, or screwing in combination in the axial direction.

Since the planetary gear unit 32 includes the first planetary gear 321 meshing with the sun gear unit 31 and the second planetary gear 322 having a smaller diameter than that of the first planetary gear 321, the speed reduction mechanism 30 having a large speed reduction ratio can be easily realized.

As illustrated in FIG. 5, the internal gear part 33 is an annular gear. Internal teeth are formed on the radially inner surface. The internal gear part 33 meshes with the second planetary gear 322 of the planetary gear unit 32. That is, the speed reduction mechanism 30 includes the annular internal gear part 33 that meshes with the planetary gear units 32 on the radially outer side of the planetary gear units 32.

As illustrated in FIG. 4, the internal gear part 33 is fixed to the output unit 35. As described above, since the internal gear part 33 is fixed to the output unit 35, it is possible to have a reduction ratio equal to or greater than a certain value with a simple configuration and to shorten the axial length of the drive device 10.

Figure 6:
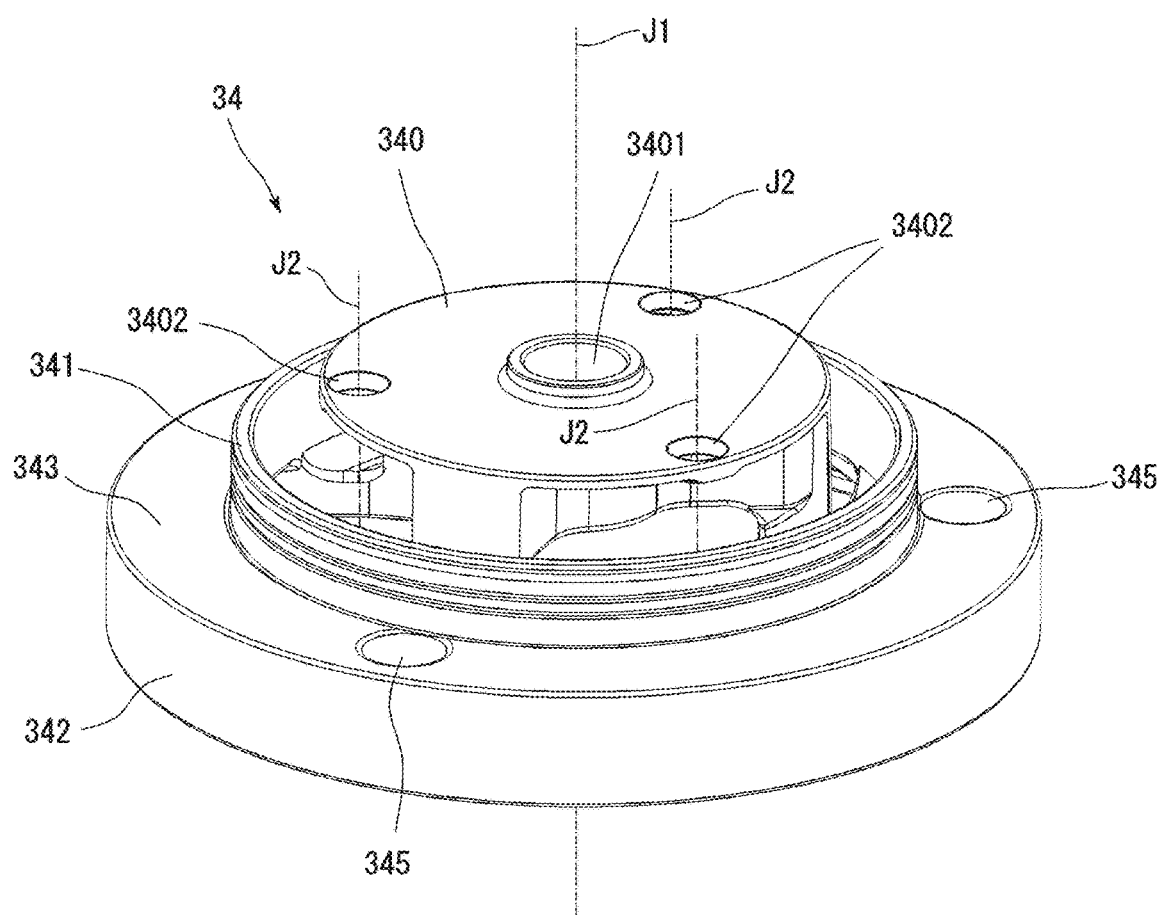
FIG. 6 is a perspective view of a carrier.

FIG. 6 is a perspective view of the carrier 34. The carrier 34 is disposed above the motor unit 20 in the axial direction. As illustrated in FIGS. 4 and 6, the carrier 34 includes a lid portion 340, a first cylindrical portion 341, a second cylindrical portion 342, a connecting portion 343, and a small shaft 344. The lid portion 340 is disposed axially above the second planetary gears 322. The lid portion 340 is orthogonal to the central axis J1. The second planetary gears 322 of the planetary gear units 32 are accommodated in the lid portion 340. At least a part of the carrier 34 surrounds the radially outer sides of the planetary gear units 32.

The lid portion 340 has a shaft hole 3401 which penetrates a central portion in the axial direction. The small shaft 344 is fixed to the shaft hole 3401. The center of the small shaft 344 coincide with the central axis J1. The lid portion 340 has three planetary through holes 3402. The three planetary through holes 3402 have equal radial distances from the central axis J1, and are arranged at equal intervals in the circumferential direction. The number of the planetary through holes 3402 is not limited to three, and is equal to or larger than the number of the planetary gear units 32.

The upper end of the planetary shaft 320 of the planetary gear unit 32 is accommodated in the planetary through hole 3402. In the drive device 10 of the present embodiment, a gap is formed between the planetary shaft 320 and the planetary through hole 3402. However, the present invention is not limited thereto, and the planetary shaft 320 may be fixed to the planetary through hole 3402 of the lid portion 340 or rotatably supported.

The carrier 34 has the first cylindrical portion 341. The first cylindrical portion 341 extends in the central axis J1 direction. The first cylindrical portion 341 is disposed radially outward of and above the sun gear unit 31. The first cylindrical portion 341 is disposed radially outward of the second planetary gears 322 of the planetary gear units 32. As illustrated in FIG. 4, the first cylindrical portion 341 is disposed axially above the first planetary gears 321. The radially outer surface of the first cylindrical portion 341 is disposed radially inward from the radially outer ends of the first planetary gears 321.

The carrier 34 has the second cylindrical portion 342. That is, the carrier 34 includes the first cylindrical portion 341, the second cylindrical portion 342, and the connecting portion 343. The second cylindrical portion 342 extends along the direction of the central axis J1. The second cylindrical portion 342 is disposed radially outward of and below the first cylindrical portion 341. The radially outer surface at the axially lower end of the second cylindrical portion 342 comes into contact with the radially outer surface of the bracket 53. That is, the second cylindrical portion 342 is fixed to the housing 50. In other words, the carrier 34 is fixed to the housing 50. That is, the second cylindrical portion 342 is fixed to the housing upper portion 51. The outer diameter of the second cylindrical portion 342 is larger than the outer diameter of the first cylindrical portion 341. The second cylindrical portion 342 surrounds the radially outer side of the first planetary gear 321 of the planetary gear unit 32. As a result, since the carrier 34 and the housing 50 can be fixed to each other, the output unit 35 can be stably rotationally driven with respect to the housing 50.

The axially lower end of the first cylindrical portion 341 and the axially upper end of the second cylindrical portion 342 are connected via the connecting portion 343. That is, the connecting portion 343 connects the first cylindrical portion 341 and the second cylindrical portion 342.

As illustrated in FIGS. 4 and 6, the connecting portion 343 has an annular shape extending in a direction orthogonal to the central axis J1. That is, the connecting portion 343 has an annular shape centered on the central axis J1.

With this configuration, the rigidity of the carrier 34 can be improved. In addition, by forming the connecting portion 343 in an annular shape, the outer diameter of the second cylindrical portion 342 can be increased while maintaining the rigidity of the carrier 34. As a result, since the carrier 34 and the housing 50 are fixed as far as possible radially outward, the motor unit 20 and the speed reduction mechanism 30 can be stably and firmly fixed.

As illustrated in FIG. 6, the connecting portion 343 includes a fixing hole 345 penetrating in the axial direction. A screw Sc2 is inserted into the fixing hole 345, and the screw Sc2 is screwed into the housing upper portion 51. Thereby, the carrier 34 is fixed to the housing 50.

The output unit 35 is connected to the planetary gear unit 32. To the output unit 35, an external device, for example, the driving wheel 103 illustrated in FIG. 1 is connected. The output unit 35 has a first region 351 and a second region 352. The first region 351 has a cylindrical shape extending in the direction of the central axis J1. The first region 351 extends in the direction of the central axis J1 and supports the radially outer surface of the bearing Br. The second region 352 extends radially inward from the upper end of the first region 351. The internal gear part 33 is fixed to the output unit 35. Specifically, the second region 352 and the internal gear part 33 are fixed by a screw Sc3. Note that the output unit 35 and the internal gear part 33 may be formed of different portions and fixed at different portions, or may be fixed by members or means other than screws. Further, the internal gear part 33 may be formed of a single member with the output unit 35.

On the upper surface of the second region 352, a recess 353 recessed in the axial direction is formed. That is, the recess 353 is formed in the second region 352. Three recesses 353 are provided in the second region 352. The three recesses 353 are arranged at equal intervals in the circumferential direction. A fixing screw Lc (see FIG. 1) for fixing the driving wheel 103 is disposed in the recess 353. For example, a female screw is formed on the inner surface of the recess 353. A through hole (not illustrated) of the driving wheel 103 is axially made to overlap with the recess 353 of the output unit 35, and the fixing screw Lc is screwed into the recess 353. In this way, the driving wheel 103 is fixed to the output unit 35. With this configuration, a driven body such as a wheel is attached via the recess 353. Since the recess 353 is disposed inside the radially outer surface of the output unit 35, it is also possible to attach a driven body having a small attached portion.

In the above configuration, the driving wheel 103 is fixed to the output unit 35 by screwing the fixing screw Lc into the recess 353, but the present invention is not limited thereto. For example, the fixing screw Lc may be fixed to the recess 353 by a fixing method such as press-fitting, and a nut may be screwed and fixed to the fixing screw Lc from the outside of the driving wheel 103.

As illustrated in FIG. 4, the second region 352 of output unit 35 is rotatably supported by the small shaft 344 via the output bearing 354. The first region 351 of the output unit 35 is rotatably supported by the first cylindrical portion 341 via the bearing Br. That is, the output unit 35 is rotatably supported by the carrier 34 via the bearing Br and the output bearing 354.

The bearing Br rotatably supports the output unit 35 on the carrier 34. That is, the first cylindrical portion 341 rotatably supports the output unit 35 via the bearing Br. The radially outer surface of the second cylindrical portion 342 is disposed radially outward from the radially outer end of the bearing Br. With this configuration, when the radial position of the output unit 35 is constant, the second cylindrical portion 342 can be disposed as radially outward as possible, and thus the output unit 35 can be more stably supported.

When the bearing Br is attached to the first cylindrical portion 341, the radially inner surface of the bearing Br is disposed radially inward the radially outer end of the first planetary gear 321. Therefore, a part of the bearing Br is disposed radially inward the radially outer end of the first planetary gear 321. That is, the bearing Br is at least partly disposed radially inward the radially outer end of the planetary gear unit 32.

With such a configuration, since the bearing Br overlaps the planetary gear unit 32 in the axial direction, the outer diameter of the planetary gear unit 32 can be increased without increasing the radial width of the drive device 10. As a result, the torque transmitted from the sun gear unit 31 to the planetary gear unit 32 can be increased without increasing the radial width of the drive device 10. That is, it is possible to form the drive device 10 that is small and can output large torque.

For example, as illustrated in FIG. 1, when the drive device 10 is used to drive the movable body 100, the movable body 100 can be downsized. In addition, the ratio of the volume occupied by the drive device 10 in the movable body 100 can be reduced. This enables a large-capacity power supply 102 to be mounted without changing the size of the movable body 100. Therefore, the continuous driving time of the movable body 100 can be extended.

More specifically, the bearing Br is supported on the radially outer surface of the first cylindrical portion 341 of the carrier 34. That is, the bearing Br is supported by the radially outer surface of the first cylindrical portion 341. Therefore, the output unit 35 is rotatably supported concentrically with the motor shaft 21 with high accuracy, and each of the planetary gear units 32 and the internal gear part 33 stably mesh with each other. As a result, the torque is stably transmitted to the output unit 35. The second cylindrical portion 342 of the carrier 34 is disposed radially outward of the first cylindrical portion 341. By attaching the bearing Br to the outer surface of the first cylindrical portion 341, it is possible to suppress an increase in diameter of the drive device 10.

Since the bearing Br is supported by the radially outer surface of the first cylindrical portion 341, the bearing Br is disposed to face the connecting portion 343 in the central axis J1 direction. The bearing Br is disposed with a gap T in the central axis J1 direction with respect to the connecting portion 343. The gap T between the bearing Br and the connecting portion 343 in the central axis J1 direction is shorter than a radial distance L1 between the radially outer surface of the second cylindrical portion 342 and the radially outer surface of the bearing Br.

With such a configuration, it is possible to suppress foreign matter such as dust and dirt from entering the inside of the bearing Br through the gap T between the bearing Br and the connecting portion 343. This allows the drive device 10 to output driving force stably over a long period of time.

The radially outer surface of the bearing Br is fixed to the radially inner surface of the first region 351 of the output unit 35. Since the output unit 35 is held by the outer ring of the bearing Br, it is possible to disperse the reaction from the driven body such as the driving wheel 103 to which the output unit 35 is connected in the entire drive device 10. As a result, it is possible to reduce the load per unit area acting on the output unit 35. (Effect of claim 9)

Figure 7:
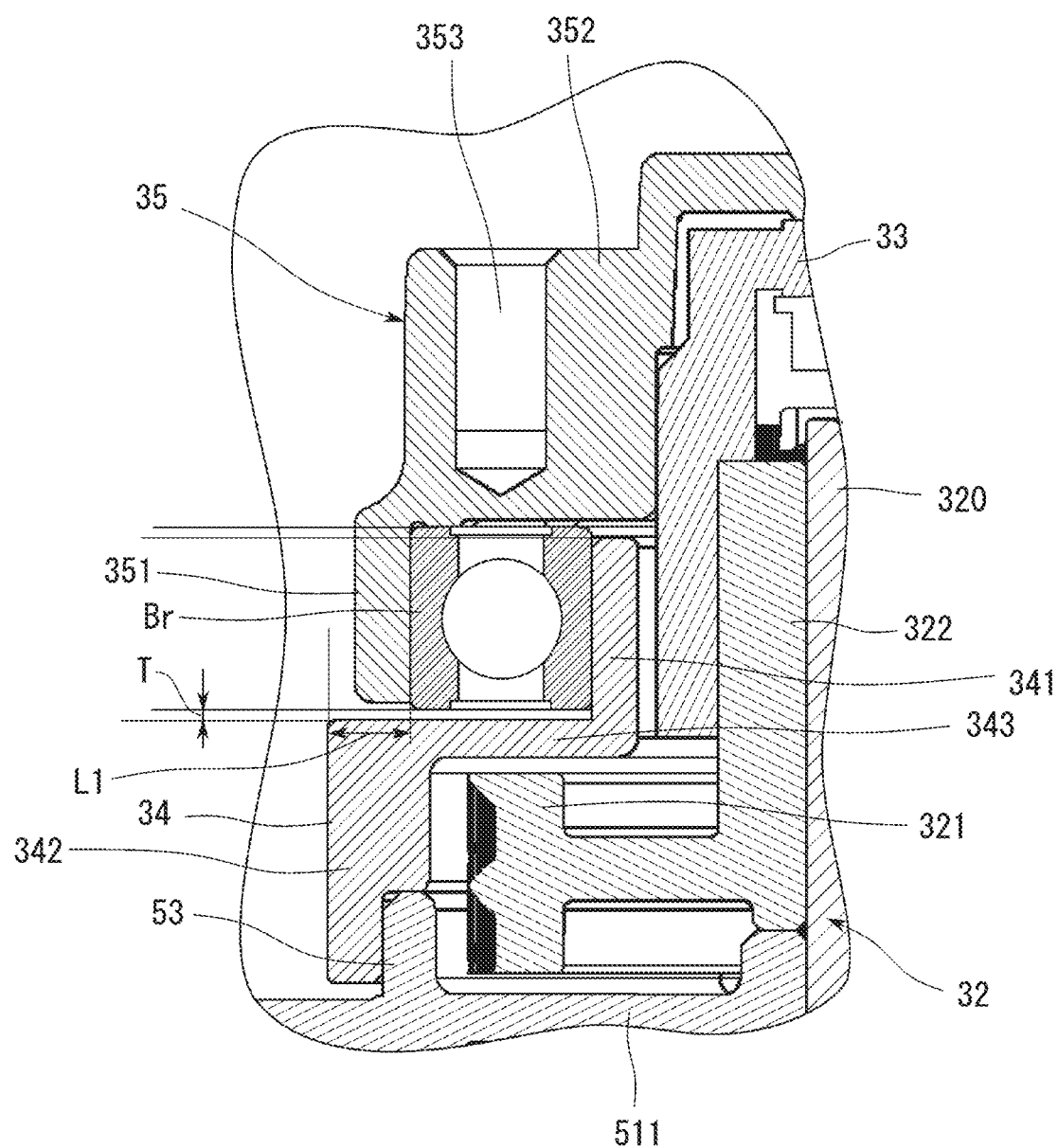
FIG. 7 is an enlarged cross-sectional view of the periphery of a bearing of the drive device.

Details of attachment of the bearing Br will be described with reference to the drawings. FIG. 7 is an enlarged cross-sectional view of the periphery of the bearing Br of the drive device 10. As illustrated in FIG. 7, the axially upper end of the first cylindrical portion 341 is disposed below the axially upper end of the bearing Br. Since the axial length of the first cylindrical portion 341 is short, the axial length of the drive device 10 is suppressed to be short. In addition, since the axial length of the first cylindrical portion 341 is shortened, the weight of the drive device 10 can be reduced.

As illustrated in FIG. 4, the axially lower end of the internal gear part 33 is disposed below the axially upper end of the bearing Br. That is, a part of the bearing Br overlaps the internal gear part 33 in the radial direction. The entire bearing Br may overlap the internal gear part 33 in the radial direction. That is, at least a part of the bearing Br overlaps the internal gear part 33 in the radial direction. As a result, as compared with the case where the internal gear part 33 is disposed above the bearing Br, since the mounting position of the internal gear part 33 can be set downward, the axial length of the drive device 10 can be suppressed to be short.

As described above, the drive device 10 is connected to the power supply 102. A current from the power supply 102 is supplied to the motor unit 20 of the drive device 10. Specifically, a current is supplied to the coil 27 of the motor unit 20. As a result, the coil 27 is excited, and the rotor 22 and the motor shaft 21 fixed to the rotor 22 rotate about the central axis J1. That is, the sun gear unit 31 disposed on the motor shaft 21 also rotates.

The torque generated by the rotation of the sun gear unit 31 is transmitted to the first planetary gear 321, and the planetary gear unit 32 rotates about the planetary axis J2. In the drive device 10, the planetary shaft 320 is fixed to the housing upper portion 51. Therefore, the planetary gear unit 32 does not move in the circumferential direction around the sun gear unit 31.

The torque during rotation of the planetary gear unit 32 is transmitted from the second planetary gear 322 to the internal gear part 33. The internal gear part 33 is fixed to the output unit 35, and the output unit 35 is rotatably supported by the carrier 34 via the bearing Br and the output bearing 354. Since the carrier 34 is fixed to the housing 50 of the motor unit 20, the output unit 35 rotates about the central axis J1 with respect to the motor unit 20.

At this time, the output unit 35 is decelerated according to the gear ratio between the sun gear unit 31 and the internal gear part 33, in other words, the torque is increased, and the output unit rotates.

Figure 8:
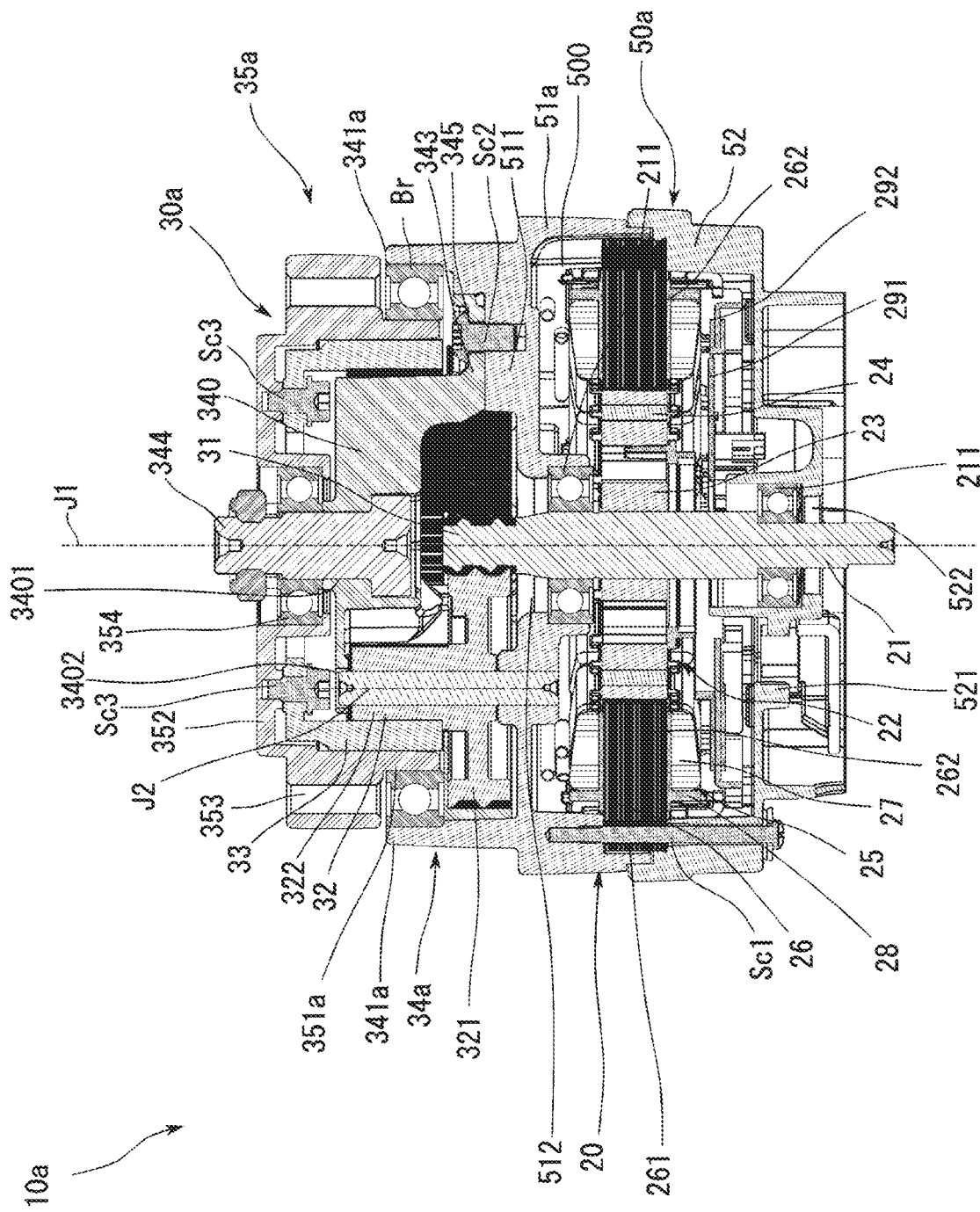
FIG. 8 is a cross-sectional view of a drive device according to a first modification.

FIG. 8 is a cross-sectional view of a drive device 10a according to a first modification. In the drive device 10a illustrated in FIG. 8, a housing 50a, and a carrier 34a and an output unit 35a of a speed reduction mechanism 30a are different from the housing 50, and the carrier 34 and the output unit 35 of the speed reduction mechanism 30 of the drive device 10 illustrated in FIG. 4. The other parts of the drive device 10a have the same configuration as those of the drive device 10. Thus, in the drive device 10a, substantially the same parts as those of the drive device 10 are denoted by the same reference numerals, and the detailed descriptions of the same parts will be omitted.

As illustrated in FIG. 8, a first cylindrical portion 341a of the carrier 34a of the speed reduction mechanism 30a has a cylindrical shape protruding upward from the upper surface of a housing upper portion 51a of the housing 50a. The bearing Br is fixed to the radially inner surface of the first cylindrical portion 341a. The radially outer surface in a first region 351a of the output unit 35a is supported by the radially inner surface of the bearing Br. Thus, the output unit 35a is rotatably supported by the first cylindrical portion 341a. With such a configuration, since the bearing Br is disposed on the radially inner side of the first cylindrical portion 341a, the radial width of the drive device 10a can be reduced.

Figure 9:
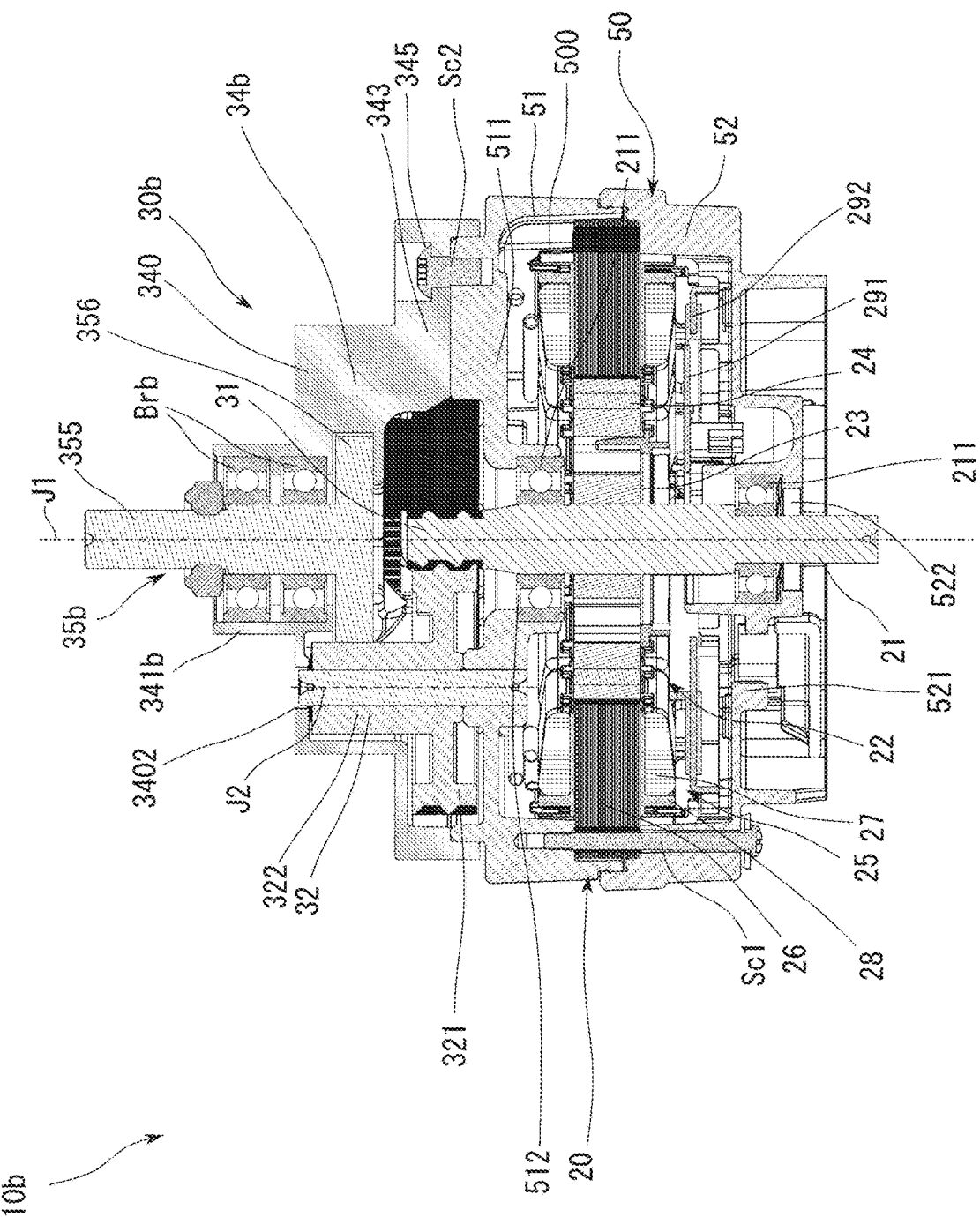
FIG. 9 is a cross-sectional view of a drive device according to a second modification.

FIG. 9 is a cross-sectional view of a drive device 10b according to a second modification. In the drive device 10b illustrated in FIG. 9, a carrier 34b and an output unit 35b are different from the carrier 34 and the output unit 35 of the drive device 10 illustrated in FIG. 4. The drive device 10b includes an external gear part 356 instead of the internal gear part 33. The other parts of the drive device 10b have the same configuration as those of the drive device 10. Thus, in the drive device 10b, substantially the same parts as those of the drive device 10 are denoted by the same reference numerals, and the detailed descriptions of the same parts will be omitted.

As illustrated in FIG. 9, the output unit 35b includes an output shaft 355 and the external gear part 356. The output shaft 355 is disposed radially above the motor shaft 21. The output shaft 355 is rotatably disposed on a radially inner surface of a first cylindrical portion 341b of a carrier 34b via a bearing Brb. The output shaft 355 is an output unit. The external gear part 356 is disposed on the radially outer surface at the axially lower end of the output shaft 355. That is, the external gear part 356 is disposed on the radially outer surface of the output shaft 355.

The external gear part 356 meshes with the second planetary gear 322 on the radially inner side of the second planetary gear 322. Rotation of the planetary gear unit 32 is transmitted to the output shaft 355 via the external gear part 356. As a result, the output shaft 355 rotates. In the drive device 10b, the driving wheel 103 is fixed to the output shaft 355.

With such a configuration of the drive device 10b, the internal gear part 33 can be omitted, so that the radial width of the drive device 10b can be reduced. In addition, it is also possible to drive with a configuration in which the number of planetary gear units 32 is small. Therefore, the number of components can be reduced.

Further, the external gear part 356 may be formed of a single member with the output shaft 355. In addition, the external gear part 356 may be attached to the output shaft 355 and fixed by a fixing method such as welding, adhesion, or press fitting.

In the drive device 10, the speed reduction mechanism 30 is a so-called star-type planetary gear mechanism in which the planetary gear unit 32 and the carrier 34 are fixed to the motor unit 20 and the internal gear part 33 rotates. However, the present invention is not limited thereto, and a planetary gear mechanism of a so-called planetary type in which the planetary gear unit and the carrier rotate with respect to the motor unit and the internal gear part is fixed may be used. In other words, the internal gear part is fixed to the motor unit. As a result, the planetary gear unit 32 having a simple configuration can be used, and the axial length can be shortened.

In this configuration, a small shaft fixed to the carrier serves as an output unit.

The present invention can be used for a movable body that obtains a driving force by electric power, such as an electric assist bicycle, an electric scooter, an electric wheelchair, or a delivery robot.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A drive device comprising:
   a motor unit including a motor shaft disposed along a central axis extending vertically; and
   a speed reduction mechanism connected to an upper portion of the motor shaft, wherein
   the speed reduction mechanism includes:
      a sun gear unit disposed on a radially outer surface of the motor shaft;
      a plurality of planetary gear units meshing with the sun gear unit and arranged in a circumferential direction;
      a carrier at least a part of which surrounds radially outer sides of the plurality of planetary gear units; and
      an output unit connected to the plurality of planetary gear units,
   the carrier includes a first cylindrical portion that is disposed radially outward of and above the sun gear unit and extends in a direction of the central axis,
   the first cylindrical portion rotatably supports the output unit via a bearing, and at least a part of the bearing is disposed radially inward of a radial outer extent of the plurality of planetary gear units relative to the central axis, and
   each of the plurality of planetary gear units includes:
      a first planetary gear that meshes with the sun gear unit; and
      a second planetary gear having a smaller diameter than a diameter of the first planetary gear and connected to the first planetary gear.

2. The drive device according to claim 1, wherein
   the motor unit includes a housing surrounding a radially outer side of a part of the motor shaft, and
   the carrier is fixed to the housing.

3. The drive device according to claim 1, wherein
   the speed reduction mechanism includes an internal gear part in an annular shape that meshes with the plurality of planetary gear units radially outward of the plurality of planetary gear units, and
   the internal gear part is fixed to the output unit.

4. The drive device according to claim 3, wherein at least a part of the bearing overlaps the internal gear part in a radial direction.

5. The drive device according to claim 1, wherein
   the speed reduction mechanism includes an internal gear part in an annular shape that meshes with the plurality of planetary gear units radially outward of the plurality of planetary gear units.

6. The drive device according to claim 1, wherein
   the output unit includes:
      an output shaft disposed above the motor shaft in an axial direction; and
      an external gear part disposed on a radially outer surface of the output shaft, and
   the external gear part meshes with the second planetary gear radially inward of the second planetary gear.

7. The drive device according to claim 1, wherein
   an axial upper end of the first cylindrical portion is disposed below an axial upper end of the bearing.

8. The drive device according to claim 1, wherein the bearing is supported by a radially inner surface of the first cylindrical portion.

9. A movable body comprising:
   the drive device according to claim 1;
   a power supply that is connected to the drive device and configured to supply electric power to the drive device; and
   a wheel fixed to the output unit.

10. A drive device, comprising:
    a motor unit including a motor shaft disposed along a central axis extending vertically; and
    a speed reduction mechanism connected to an upper portion of the motor shaft, wherein
    the speed reduction mechanism includes:
       a sun gear unit disposed on a radially outer surface of the motor shaft;

a plurality of planetary gear units meshing with the sun gear unit and arranged in a circumferential direction;

a carrier at least a part of which surrounds radially outer sides of the plurality of planetary gear units; and an output unit connected to the plurality of planetary gear units, the carrier includes a first cylindrical portion that is disposed radially outward of and above the sun gear unit and extends in a direction of the central axis, the first cylindrical portion rotatably supports the output unit via a bearing, and at least a part of the bearing is disposed radially inward of a radial outer extent of the plurality of planetary gear units relative to the central axis, the motor unit includes a housing surrounding a radially outer side of a part of the motor shaft, the carrier is fixed to the housing, the carrier includes:
  the first cylindrical portion;
  a second cylindrical portion that is disposed radially outward of and below the first cylindrical portion, extends along the direction of the central axis, and is fixed to the housing; and
  a connecting portion that connects the first cylindrical portion and the second cylindrical portion, and the bearing is supported by a radially outer surface of the first cylindrical portion, the bearing is disposed to face the connecting portion in the direction of the central axis, and a gap between the bearing and the connecting portion in the direction of the central axis is shorter than a radial distance between a radially outer surface of the second cylindrical portion and a radially outer surface of the bearing.

11. The drive device according to claim 10, wherein the connecting portion has an annular shape centered on the central axis.

12. The drive device according to claim 10, wherein the radially outer surface of the second cylindrical portion is disposed radially outward of a radially outer periphery of the bearing.

13. A drive device, comprising:

a motor unit including a motor shaft disposed along a central axis extending vertically; and a speed reduction mechanism connected to an upper portion of the motor shaft, wherein the speed reduction mechanism includes:
  a sun gear unit disposed on a radially outer surface of the motor shaft;
  a plurality of planetary gear units meshing with the sun gear unit and arranged in a circumferential direction;
  a carrier at least a part of which surrounds radially outer sides of the plurality of planetary gear units; and
  an output unit connected to the plurality of planetary gear units, the carrier includes a first cylindrical portion that is disposed radially outward of and above the sun gear unit and extends in a direction of the central axis, the first cylindrical portion rotatably supports the output unit via a bearing, and at least a part of the bearing is disposed radially inward of a radial outer extent of the plurality of planetary gear units relative to the central axis, the output unit includes:
  a first region extending in the direction of the central axis and supporting a radially outer surface of the bearing; and
  a second region extending radially inward from an upper end portion of the first region, and a recess is formed in the second region.

* * * * *